United States Patent
Wong et al.

(10) Patent No.: US 11,828,228 B2
(45) Date of Patent: Nov. 28, 2023

(54) AIRCRAFT HAVING A SINGLE FLUID INLET APERTURE

(71) Applicant: ROLLS-ROYCE PLC, London (GB)

(72) Inventors: Natalie C Wong, Bristol (GB); Thomas S Binnington, Bristol (GB); David A Jones, Bristol (GB); Daniel Blacker, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/110,664

(22) Filed: Feb. 16, 2023

(65) Prior Publication Data

US 2023/0193822 A1    Jun. 22, 2023

Related U.S. Application Data

(63) Continuation of application No. 17/484,622, filed on Sep. 24, 2021, now Pat. No. 11,649,764.

(30) Foreign Application Priority Data

Oct. 9, 2020   (GB) ...................................... 2016000
Jan. 26, 2021  (GB) ...................................... 2101016

(51) Int. Cl.
*F02C 7/18*    (2006.01)
*F02C 7/14*    (2006.01)
(Continued)

(52) U.S. Cl.
CPC ................ *F02C 7/04* (2013.01); *B64D 27/10* (2013.01); *B64D 27/20* (2013.01); *B64D 33/02* (2013.01);
(Continued)

(58) Field of Classification Search
CPC ...... F02C 7/12; F02C 7/14; F02C 7/18; F02C 7/185; F02C 7/224
See application file for complete search history.

(56) References Cited

U.S. PATENT DOCUMENTS 2,474,258 A    6/1949   Kroon
2,973,165 A    2/1961   Macaulay
(Continued)

FOREIGN PATENT DOCUMENTS

EP    1 436 193 B1    1/2006
EP    1 916 399 A2    4/2008
(Continued)

OTHER PUBLICATIONS

The Decline of the TFE731-3 Turbine Engine; https://turbineengine.com/blog/the-decline-of-the-tfe731-3-turbine-engine/; retrieved on Jul. 15, 2021.
(Continued)

*Primary Examiner* — Thuyhang N Nguyen
(74) *Attorney, Agent, or Firm* — Oliff PLC (57) ABSTRACT

An aircraft includes a machine body that encloses a turbofan gas turbine engine and a plurality of ancillary systems. The turbofan gas turbine engine includes, in axial flow sequence, a first heat exchanger module, a fan assembly, a compressor module, a combustor module, a turbine module, and an exhaust module. The aircraft includes a second heat exchanger module. The machine body comprises a single fluid inlet aperture, with the fluid inlet aperture being configured to allow a fluid cooling flow to enter the machine body and to pass through the first heat exchanger module. When a temperature of the fluid cooling flow is less than a temperature of a fluid to be cooled, the fluid to be cooled is directed to the first heat exchanger module, and when a temperature of the fluid cooling flow is greater than a temperature of the fluid to be cooled, the fluid to be cooled is directed to the second heat exchanger module and cooled using a fuel supply for the gas turbine engine.

11 Claims, 4 Drawing Sheets

(51) Int. Cl.

| | | |
|---|---|---|
| *F02C 7/04* | (2006.01) | |
| *B64D 27/10* | (2006.01) | |
| *B64D 33/02* | (2006.01) | |
| *B64D 33/04* | (2006.01) | |
| *B64D 33/08* | (2006.01) | |
| *B64D 27/20* | (2006.01) | |
| *B64D 33/10* | (2006.01) | |
| *F02K 3/06* | (2006.01) | |
| *F02K 3/075* | (2006.01) | |
| *F02C 7/08* | (2006.01) | |
| *F02C 7/12* | (2006.01) | |
| *F01D 9/06* | (2006.01) | |
| *F02K 3/115* | (2006.01) | |

(52) U.S. Cl.
CPC ............ *B64D 33/04* (2013.01); *B64D 33/08* (2013.01); *B64D 33/10* (2013.01); *F01D 9/065* (2013.01); *F02C 7/08* (2013.01); *F02C 7/12* (2013.01); *F02C 7/18* (2013.01); *F02K 3/06* (2013.01); *F02K 3/075* (2013.01); *B64D 2033/024* (2013.01); *B64D 2033/0286* (2013.01); *F02C 7/14* (2013.01); *F02K 3/115* (2013.01); *F05D 2220/323* (2013.01); *F05D 2220/36* (2013.01); *F05D 2260/213* (2013.01)

(56) References Cited

U.S. PATENT DOCUMENTS

| | | |
|---|---|---|
| 4,601,202 A | 7/1986 | Colman et al. |
| 6,575,406 B2 | 6/2003 | Nelson |
| 6,729,575 B2 | 5/2004 | Bevilaqua |
| 6,918,244 B2 | 7/2005 | Dickau |
| 8,387,362 B2 | 3/2013 | Storage et al. |
| 9,920,708 B2 | 3/2018 | Suciu et al. |
| 10,260,371 B2 | 4/2019 | Youssef et al. |
| 2003/0136103 A1* | 7/2003 | Reuter .................. F02C 7/236 60/734 |
| 2013/0097998 A1 | 4/2013 | Marche |
| 2014/0205446 A1 | 7/2014 | Patsouris et al. |
| 2017/0009118 A1 | 1/2017 | Colborn et al. |
| 2017/0191413 A1 | 7/2017 | Knight et al. |
| 2018/0050810 A1 | 2/2018 | Niergarth et al. |
| 2019/0145273 A1 | 5/2019 | Frank et al. |

FOREIGN PATENT DOCUMENTS

| | | |
|---|---|---|
| EP | 3 026 240 A1 | 6/2016 |
| EP | 3 026 240 B1 | 11/2017 |
| EP | 3 290 846 A1 | 3/2018 |
| GB | 2512442 A | 10/2014 |

OTHER PUBLICATIONS

The Fokker Aircraft Page. Rolls Royce Tay Engine.; www.fokker-aircrat.info/tay.htm; retrieved on Jul. 15, 2021.

Pratt & Whitney Canada PW600/PW610/PW615/PW617/PW625; all-aero.com/index.php/contactus/64-engines-power/13505-pratt-whitney-canada-pw600-pw610-pw615-pw617-pw625; retrieved on Jul. 15, 2021.

Mar. 18, 2021 Search Report issued in British Patent Application No. 2016000.8.

Jul. 9, 2021 Search Report issued in British Patent Application No. 2101016.0.

Feb. 16, 2022 extended Search Report issued in European Patent Application No. 21198168.3.

* cited by examiner

AIRCRAFT HAVING A SINGLE FLUID INLET APERTURE

This application is a continuation application of U.S. patent application Ser. No. 17/484,622 filed Sep. 24, 2021, which claims the benefit of UK Patent Application No. GB 2101016.0 filed on 26 Jan. 2021, and UK Patent Application No. GB 2016000.8, filed on 9 Oct. 2020, each of which is hereby incorporated herein in its entirety.

FIELD OF THE DISCLOSURE

The present disclosure relates to an aircraft having a single engine air intake aperture and a single engine exhaust aperture for each engine and particularly, but not exclusively, to an aircraft having a single engine air intake aperture and a single engine exhaust aperture with an airframe heat exchanger positioned in the air intake aperture.

BACKGROUND TO THE DISCLOSURE

A conventional turbofan gas turbine engine uses heat exchangers to cool a variety of fluids including inter alia air, fuel and oil. Typically, such heat exchangers use bypass air or an air offtake from the compressor as the cooling medium. The heat exchanger itself may be positioned in the bypass duct or externally to the engine with the corresponding ducting.

The use of bypass air or a compressor offtake stream as the cooling medium in a heat exchanger will adversely affect the performance of the engine, for example by reducing specific thrust or increasing specific fuel consumption. Alternatively, or additionally, such offtakes can adversely affect engine performance, for example by reducing surge margin.

In a further alternative conventional arrangement, an airflow to provide the cooling medium in a heat exchanger may be drawn separately from the airflow through the gas turbine engine. For example, in an airframe application the airflow providing the cooling medium may be drawn from an air intake or duct separate from the engine.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

STATEMENTS OF DISCLOSURE

According to a first aspect of the present disclosure, there is provided an aircraft comprising a machine body, the machine body enclosing a turbofan gas turbine engine and a plurality of ancillary systems, the turbofan gas turbine engine comprising, in axial flow sequence, a heat exchanger module, a fan assembly, a compressor module, a combustor module, a turbine module, and an exhaust module;

wherein the machine body comprises a single fluid inlet aperture, the fluid inlet aperture being configured to allow a fluid cooling flow to enter the machine body and to pass through the heat exchanger module, the heat exchanger module being configured to transfer a waste heat load from the gas turbine engine and the ancillary systems to the fluid cooling flow prior to an entry of the entire fluid cooling flow into the fan module.

In an aircraft according to this arrangement, all of the air that is used to cool both the engine and any ancillary systems of the aircraft is ingested by the turbofan gas turbine engine. This means that the entirety of the cooling air flow used by the aircraft passes through the turbofan gas turbine engine and so contributes to providing thrust to the aircraft.

In contrast, a conventional aircraft comprises external cooling inlets (such as scoops or ducts) on the airframe that provide cooling air to separate heat exchangers that cool the engine system and/or airframe ancillary systems. In such arrangements, the cooling air flows make no contribution to aircraft thrust and indeed cause parasitic drag on the aircraft.

By arranging for all of the cooling air to pass through the turbofan engine, the overall efficiency of the aircraft can be increased relative to conventional arrangements as described in the previous paragraph.

Optionally, a proportion $B_{COMB}$ of the fluid cooling flow passes sequentially through the compressor, combustor, and turbine modules, wherein the $B_{COMB}$ parameter is defined in the range of 0.20 to 0.71

In one arrangement of the engine with a bypass ratio of 0.4, the proportion of the fluid cooling flow that passes the engine core, namely the $B_{COMB}$ parameter, is 0.71.

Optionally, the $B_{COMB}$ parameter is defined in the range of 0.29 to 0.71.

In another arrangement of the engine, this time with a bypass ratio of 1.0, the proportion of the fluid cooling flow that passes the engine core, namely the $B_{COMB}$ parameter, is 0.50.

Optionally, the machine body further comprises a single fluid exhaust aperture, the fluid exhaust aperture being configured to channel the fluid flow from the or each exhaust module out of the machine body.

The use of a single exhaust aperture minimises the aerodynamic drag associated with an exhaust stream from the turbofan gas turbine engine (or engines) leaving the aircraft.

In an arrangement with two turbofan gas turbine engines, the exhaust flow from the exhaust modules of each of the turbofan gas turbine engines exits the airframe through a single exhaust aperture. The exhaust aperture may be bifurcated with each bifurcated portion carrying an exhaust flow from a respective one of the turbofan gas turbine engines.

Optionally, the fan assembly comprises a plurality of fan blades defining a fan diameter (D), and the fan diameter D is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip diameter, measured across a centreline of the engine and between an outermost tip of opposing fan blades at their leading edge, may be in the range from 95 cm to 200 cm, for example in the range from 110 cm to 150 cm, or alternatively in the range from 155 cm to 200 cm. The fan tip diameter may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be greater than 160 cm.

The fan tip diameter may be in the range from 95 cm to 150 cm, optionally in the range from 110 cm to 150 cm, optionally in the range of from 110 cm to 145 cm, and further optionally in the range from 120 cm to 140 cm.

The fan tip diameter may be in the range from 155 cm to 200 cm, optionally in the range from 160 cm to 200 cm, and further optionally in the range from 165 cm to 190 cm.

According to a further aspect of the present disclosure, there is provided a method of operating an aircraft, the aircraft comprising a machine body, the machine body enclosing a turbofan gas turbine engine and a plurality of ancillary systems, the turbofan gas turbine engine comprising, in axial flow sequence, a heat exchanger module, a fan assembly, a compressor module, a combustor module, a turbine module, and an exhaust module;
  wherein the method comprises the steps of:
  (i) providing the machine body;
  (ii) arranging the fan assembly, the compressor module, the combustor module, the turbine module, and the exhaust module within the machine body;
  (iii) providing the machine body with a single fluid inlet aperture, the fluid inlet aperture being configured to allow a fluid flow to enter the machine body and to pass through the heat exchanger module;
  (iv) configuring the heat exchanger module to transfer a waste heat load from the gas turbine engine and the ancillary systems to the fluid flow prior to an entry of the fluid flow into the fan module; and
  (v) operating the engine such that the entire fluid flow enters the fan module.

In an aircraft according to this arrangement, all of the air that is used to cool both the engine and any ancillary systems of the aircraft is ingested by the turbofan gas turbine engine. This means that the entirety of the cooling air flow used by the aircraft passes through the turbofan gas turbine engine and so contributes to providing thrust to the aircraft.

In contrast, a conventional aircraft comprises external cooling inlets (such as scoops or ducts) on the airframe that provide cooling air to separate heat exchangers that cool the engine system and/or airframe ancillary systems. In such arrangements, the cooling air flows make no contribution to aircraft thrust and indeed cause parasitic drag on the aircraft.

By arranging for all of the cooling air to pass through the turbofan engine, the overall efficiency of the aircraft can be increased relative to conventional arrangements as described in the previous paragraph.

Optionally, step (v) comprises the step of:
  (v)' operating the engine such that the entire fluid flow enters the fan module, and a proportion $B_{COMB}$ of the fluid flow passes sequentially through the compressor, combustor, and turbine modules, and the $B_{COMB}$ parameter is defined in the range of 0.20 to 0.71.

In one arrangement of the engine with a bypass ratio of 0.4, the proportion of the fluid cooling flow that passes the engine core, namely the $B_{COMB}$ parameter, is 0.71.

Optionally, step (iii) comprises the additional following step of:
  (iii)' providing the machine body with a single fluid exhaust aperture, the fluid exhaust aperture being configured to channel the fluid flow from the exhaust module out of the machine body.

The use of a single exhaust aperture minimises the aerodynamic drag associated with an exhaust stream from the turbofan gas turbine engine (or engines) leaving the aircraft.

In an arrangement with two turbofan gas turbine engines, the exhaust flow from the exhaust modules of each of the turbofan gas turbine engines exits the airframe through a single exhaust aperture. The exhaust aperture may be bifurcated with each bifurcated portion carrying an exhaust flow from a respective one of the turbofan gas turbine engines.

According to a further aspect of the present disclosure, there is provided an aircraft comprising a machine body, the machine body enclosing a turbofan gas turbine engine and a plurality of ancillary systems, the turbofan gas turbine engine comprising, in axial flow sequence, a heat exchanger module, a fan assembly, a compressor module, a turbine module, and an exhaust module;
  wherein the machine body comprises a single fluid inlet aperture, the fluid inlet aperture being configured to allow a fluid flow to enter the machine body and to pass through the heat exchanger module, the heat exchanger module being configured to transfer a waste heat load from the gas turbine engine and the ancillary systems to the fluid flow prior to an entry of the fluid flow into the fan module, and thence the compressor module, the turbine module, and the exhaust module.

By performing all aircraft cooling through the inlet air stream that feeds the turbofan gas turbine engine, other air intakes and scoops to provide cooling air flows to the airframe can be eliminated. Minimising the quantity of apertures on the airframe will reduce the aerodynamic drag on the airframe and so improve the aerodynamic efficiency of the airframe.

The use of 'cool' inlet air to absorb waste heat load maximises the heat exchanger efficiency. Reducing the temperature of the heat energy absorbing fluid in the heat exchanger will increase the efficiency of the heat exchanger by increasing the temperature differential between the primary and secondary fluids in the heat exchanger.

In this arrangement, all the active heat rejection (from the gas turbine engine and the ancillary systems) is rejected into the fluid flow entering the gas turbine engine. It will be understood that there may be some passive heat rejection through the surface of the machine body.

In contrast, the engine offtake flow used in a conventional turbofan engine (for example from a compressor stage or from the bypass flow) for providing a cooling feed flow to a heat exchanger will have a considerably higher temperature than the intake air flow entering the turbofan engine. This in turn limits the temperature at which heat can be rejected to the heat exchanger to temperatures that are greater than that of the corresponding engine offtake flow. Such a prior art arrangement will also require a larger and less efficient heat exchanger than that of the present invention for the same quantity of heat rejection. In addition, such conventional arrangements result in a loss of propulsive flow and a consequent reduction in overall engine efficiency.

In an aircraft according to the present disclosure, the location of the heat exchanger in an inlet duct upstream of the fan assembly means that the engine is able to use all of the intake air that is used by the heat exchanger module to dissipate waste energy to subsequently provide propulsive thrust. This means that an aircraft according to the present disclosure can be more efficient than a conventional aircraft while providing the same level of heat exchanger capacity.

The positioning of the heat exchanger upstream of the fan assembly means that the cooling air flow entering the heat exchanger has a temperature that is lower than any engine offtake flow, for example a bleed flow from a compressor stage or the bypass flow. Consequently, in a turbofan engine according to the present disclosure it becomes possible to reject heat to the heat exchanger flow at a lower temperature than can be achieved with any prior art arrangement described above. This makes the turbofan engine according to the present disclosure more versatile than conventional turbofan engines.

Optionally, the machine body comprises two fluid inlet apertures, each of the fluid inlet apertures being configured to allow a respective fluid flow to enter the machine body, the two fluid flows then being blended together prior to entry of the blended fluid flow into the heat exchanger module.

In an alternative arrangement, the machine body may comprise two fluid inlet apertures. Each of the two fluid inlet apertures is configured to allow a respective intake air flow to enter the machine body. The two intake air flows are then blended together within the machine body.

The single blended intake air flow to the turbofan gas turbine engine passes through the heat exchanger module prior to entry into the fan module and thence to the compressor, combustor, turbine and exhaust modules.

In an alternative arrangement, a heat exchanger module is provided in each of the two fluid inlet flows between the respective inlet aperture and the point at which the two intake air flows are blended together. These two heat exchanger modules replace the single heat exchanger module upstream of the fan that has been previously described.

According to a further aspect of the present disclosure, there is provided a method of operating an aircraft, the aircraft comprising a machine body, the machine body enclosing a turbofan gas turbine engine and a plurality of ancillary systems, the turbofan gas turbine engine comprising, in axial flow sequence, a heat exchanger module, a fan assembly, a compressor module, a combustor module, a turbine module, and an exhaust module;

wherein the method comprises the steps of:
(i) providing the machine body;
(ii) arranging the fan assembly, the compressor module, the combustor module, the turbine module, and the exhaust module within the machine body;
(iii) providing the machine body with a single fluid inlet aperture, the fluid inlet aperture being configured to allow a fluid flow to enter the machine body and to pass through the heat exchanger module;
(iv) configuring the heat exchanger module to transfer a waste heat load from the gas turbine engine and the ancillary systems to the fluid flow prior to an entry of the fluid flow into the fan module; and
(v) operating the engine such that the waste heat load from the gas turbine engine and the ancillary systems is transferred to the fluid flow prior to the entry of the fluid flow into the fan module.

By performing all aircraft cooling through the inlet air stream that feeds the turbofan gas turbine engine, other air intakes and scoops to provide cooling air flows to the airframe can be eliminated. Minimising the quantity of apertures on the airframe will reduce the aerodynamic drag on the airframe and so improve the aerodynamic efficiency of the airframe.

The use of 'cool' inlet air to absorb waste heat load maximises the heat exchanger efficiency. Reducing the temperature of the heat energy absorbing fluid in the heat exchanger will increase the efficiency of the heat exchanger by increasing the temperature differential between the primary and secondary fluids in the heat exchanger.

In contrast, the engine offtake flow used in a conventional turbofan engine (for example from a compressor stage or from the bypass flow) for providing a cooling feed flow to a heat exchanger will have a considerably higher temperature than the intake air flow entering the turbofan engine. This in turn limits the temperature at which heat can be rejected to the heat exchanger to temperatures that are greater than that of the corresponding engine offtake flow. In addition, such conventional arrangements result in a loss of propulsive flow and a consequent reduction in overall engine efficiency.

In an aircraft according to the present disclosure, the location of the heat exchanger in an inlet duct upstream of the fan assembly means that the engine is able to use all of the intake air that is used by the heat exchanger module to dissipate waste energy to subsequently provide propulsive thrust. This means that an aircraft according to the present disclosure can be more efficient than a conventional aircraft while providing the same level of heat exchanger capacity.

The positioning of the heat exchanger upstream of the fan assembly means that the cooling air flow entering the heat exchanger has a temperature that is lower than any engine offtake flow, for example a bleed flow from a compressor stage or the bypass flow. Consequently, in a turbofan engine according to the present disclosure it becomes possible to reject heat to the heat exchanger flow at a lower temperature than can be achieved with any prior art arrangement described above. This makes the turbofan engine according to the present disclosure more versatile than conventional turbofan engines.

Optionally, step (iii) comprises the steps of:
(iii-a) providing the machine body with two fluid inlet apertures, each of the two fluid inlet apertures being configured to allow a respective fluid flow to enter the machine body;
(iii-b) blending together the two fluid flows prior to entry of the blended fluid flow into the heat exchanger module.

In an alternative arrangement, the machine body may comprise two fluid inlet apertures. Each of the two fluid inlet apertures is configured to allow a respective intake air flow to enter the machine body. The two intake air flows are then blended together within the machine body.

The single blended intake air flow to the turbofan gas turbine engine passes through a heat exchange module prior to entry into the fan module and thence to the compressor, combustor, turbine and exhaust modules.

Optionally, step (iii) comprises the additional following step of:
(iii)' providing the machine body with a single fluid exhaust aperture, the fluid exhaust aperture being configured to channel the fluid flow from the exhaust module out of the machine body.

The use of a single exhaust aperture minimises the aerodynamic drag associated with an exhaust stream from the turbofan gas turbine engine (or engines) leaving the aircraft.

In an arrangement with two turbofan gas turbine engines, the exhaust flow from the exhaust modules of each of the turbofan gas turbine engines exits the airframe through a single exhaust aperture. The exhaust aperture may be bifurcated with each bifurcated portion carrying an exhaust flow from a respective one of the turbofan gas turbine engines.

According to a further aspect of the present disclosure, there is provided an aircraft comprising a machine body, the machine body enclosing a turbofan gas turbine engine, the turbofan gas turbine engine comprising, in axial flow sequence, a heat exchanger module, a fan assembly, a compressor module, a turbine module, and an exhaust module, the heat exchanger module being in fluid communication with the fan assembly by an inlet duct, the heat exchanger module comprising a plurality of first heat transfer elements, the first heat transfer elements being configured for the transfer of heat energy from a first fluid contained within the first heat transfer elements to an airflow passing over a surface of the first heat transfer elements prior to entry of the airflow into an inlet to the fan assembly, the first fluid contained within the first heat transfer elements having a temperature $T_F$, the airflow passing over the surface of the first heat transfer elements having a temperature $T_A$, the turbofan gas turbine engine further comprising at least one second heat transfer element, the or each second heat transfer element being configured for the transfer of heat energy from the first fluid to a second fluid, wherein in use the aircraft can maintain a sustained airspeed V (M), and when the airflow temperature $T_A$ is less than the first fluid temperature $T_F$, the first fluid passes through the first heat transfer elements, and when the airflow temperature $T_A$ is equal to or greater than the first fluid temperature $T_F$, the first fluid passes through the second heat transfer elements.

When the airflow temperature $T_A$ is less than the first fluid temperature $T_F$ the first fluid is circulated through the first heat transfer elements in the heat exchanger module and heat energy from the first fluid is rejected to the airflow passing through the heat exchanger module and passing over the surface of the first heat transfer elements.

When the airflow temperature $T_A$ is less than the first fluid temperature $T_F$, the waste heat energy can be effectively transferred from the first fluid to the air flow in the first heat transfer elements. For example, at a sustained airspeed of M 0.95 the incoming airflow may have a temperature of approximately 65° C., while the first fluid may typically have a temperature of approximately 150° C.

However, when the sustained airspeed increases, for example to a supersonic level, the temperature of the air flow entering the heat exchanger increases above the ambient air temperature. This is because the air flow must be slowed to a subsonic level as it enters the inlet to the turbofan engine. In the process of slowing the air flow its temperature increases because of the viscous losses caused in slowing the air flow.

The temperature of the airflow may therefore be greater than the temperature of the first fluid, which makes it impossible to reject waste heat energy from the first fluid to the airflow passing through the heat exchanger module.

Consequently, at a high sustained airspeed, for example M1.0 or greater, the first fluid passes through the second heat transfer elements and heat energy from the first fluid is rejected to the second fluid in passing through the second heat transfer elements. The second fluid temperature is greater than the temperature of the ambient air that would enter the turbofan engine at a low sustained airspeed, for example less than M1.0, but is less than the temperature of the air flow entering the turbofan engine at a high sustained airspeed, for example greater than M1.0.

Optionally, the heat exchanger module has a flow area $A_{HEX}$ and the fan module has a flow area $A_{FAN}$, and a ratio of $A_{FAN}$ to $A_{HEX}$ being in the range of 0.3 to 1.0.

The flow area is to be understood to mean a cross-sectional area of the air flow taken perpendicularly to a central axis of the flow in the flow direction. In other words, for the heat exchanger module the flow area $A_{HEX}$ corresponds to the cross-sectional area of the heat exchanger module through which the flow passes. Likewise, for the fan assembly the flow area $A_{FAN}$ corresponds to the cross-sectional area of the fan assembly through which the flow passes.

Optionally, the heat exchanger module has a fluid path diameter E, wherein the fluid path diameter E is greater than the fan diameter D.

In one embodiment, the heat exchanger module has a fluid path diameter E that is greater than the fan diameter D. In this embodiment, the inlet duct that connects the heat exchanger module to the fan assembly has a diameter than converges from an exit from the heat exchanger module to an entrance to the fan assembly.

Optionally, the turbofan gas turbine engine further comprises an outer housing, the outer housing enclosing the sequential arrangement of heat exchanger module, fan assembly, compressor module, and turbine module, an annular bypass duct being defined between the outer housing and the sequential arrangement of modules, a bypass ratio being defined as a ratio of a mass air flow rate through the bypass duct to a mass air flow rate through the sequential arrangement of modules, and wherein the bypass ratio is less than 4.0.

A turbofan engine having a bypass ratio (BPR) of less than approximately 4.0 will have a generally smaller bypass duct (the annular duct surrounding the core gas turbine engine) than a turbofan engine having a BPR greater than approximately 4.0. For a turbofan engine with a BPR greater than, say, 4.0, the correspondingly larger bypass duct volume provides more scope for positioning a heat exchanger within the bypass duct than would be the case for a low BPR turbofan engine.

Optionally, the fan assembly comprises two or more fan stages, at least one of the fan stages comprising a plurality of fan blades defining the fan diameter D.

In one arrangement, the fan assembly has two fan stages with both fan stages comprising a plurality of fan blades defining the same fan diameter. Alternatively, each of the fan stages may have different fan diameters.

According to a further aspect of the present disclosure, there is provided a method of operating an aircraft comprising a machine body, the machine body enclosing a turbofan gas turbine engine, the gas turbine engine comprising, in axial flow sequence, a heat exchanger module, an inlet duct, a fan assembly, a compressor module, a turbine module, and an exhaust module, and wherein the method comprises the steps of:

(i) providing the fan assembly, the compressor module, the turbine module, and the exhaust module;

(ii) providing the heat exchanger module with a plurality of first heat transfer elements for transfer of heat from a first fluid contained within the heat transfer elements to an airflow passing over a surface of the heat transfer elements prior to entry of the airflow into the fan assembly, the first fluid having a temperature $T_F$;

(iii) providing the heat exchanger module with at least one second heat transfer element for the transfer of heat from the first fluid to a second fluid (iv) positioning the heat exchanger module in fluid communication with the fan assembly by the inlet duct; and (v) operating the aircraft such that the aircraft maintains a sustained airspeed V and the airflow passing over a surface of the heat transfer elements has a temperature $T_A$;

(vi) if temperature $T_A$ is less than temperature $T_F$, directing the first fluid through the first heat transfer elements; and (vii) if temperature $T_A$ is equal to or greater than temperature $T_F$, directing the first fluid through the second heat transfer elements.

When the airflow temperature $T_A$ is less than the first fluid temperature $T_F$, the first fluid is circulated through the first heat transfer elements in the heat exchanger module and heat energy from the first fluid is rejected to the airflow passing through the heat exchanger module and passing over the surface of the first heat transfer elements.

When the airflow temperature $T_A$ is less than the first fluid temperature $T_F$, the waste heat energy can be effectively transferred from the first fluid to the air flow in the first heat transfer elements. For example, at a sustained airspeed of M 0.95 the incoming airflow may have a temperature of approximately 65° C., while the first fluid may typically have a temperature of approximately 150° C.

However, when the sustained airspeed increases, for example to a supersonic level, the temperature of the air flow entering the heat exchanger increases above the ambient air temperature. This is because as the air flow must be slowed to a subsonic level as it enters the inlet to the turbofan engine. In the process of slowing the air flow its temperature increases because of the viscous losses caused in slowing the air flow.

The temperature of the air flow may therefore be greater than the temperature of the first fluid, which makes it impossible to reject waste heat energy from the first fluid to the airflow passing through the heat exchanger module.

Consequently, at a high sustained airspeed, for example M1.0 or greater, the first fluid passes through the second heat transfer elements and heat energy from the first fluid is rejected to the second fluid in passing through the second heat transfer elements. The second fluid temperature is greater than the temperature of the ambient air that would enter the turbofan engine at a low sustained airspeed, for example less than M1.0, but is less than the temperature of the air flow entering the turbofan engine at a high sustained airspeed, for example greater than M1.0.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.40, 0.39, 0.38, 0.37, 0.36, 0.35, 0.34, 0.33, 0.32, 0.31, 0.30, 0.29, 0.28, 0.27 or 0.26. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The diameter of the fan may be measured across the engine centreline and between the tips of opposing fan blades at their leading edge. The fan diameter may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 130 inches). The fan diameter may be in an inclusive range bounded by any two of the values in the previous sentence (i.e. the values may form upper or lower bounds), for example in the range of from 50 cm to 70 cm or 90 cm to 130 cm.

The fan face area may be equal to π multiplied by the square of the fan tip radius.

The rotational speed of the fan may vary in use. Generally, the rotational speed is lower for fans with a higher diameter. Purely by way of non-limitative example, the rotational speed of the fan in steady-state flight conditions may be less than 10000 rpm, for example less than 9000 rpm. Purely by way of further non-limitative example, the rotational speed of the fan in steady-state flight conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan in steady-state flight conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, 1.5, 1.6, 1.7, 1.8, 1.9, 2.0, 2.4, 2.8, 3.2, 3.6, or 4.0. The bypass ratio may be in an inclusive range bounded by any two of the values in the previous sentence (i.e. the values may form upper or lower bounds), for example in the range of form of 0.4 to 1.0, 0.5 to 0.9, or 0.6 to 0.9. Alternatively, the bypass ratio may be in a bounded range in the form of 1.0 to 4.0, 1.8 to 3.6, or 2.4 to 3.6. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein in steady-state flight may be greater than (or on the order of) any of the following: 10, 15, 20, 25, 30, 35 or 40. The overall pressure ratio may be in an inclusive range bounded by any two of the values in the previous sentence (i.e. the values may form upper or lower bounds), for example in the range of from 20 to 35.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan stage of a turbofan gas turbine engine as described and/or claimed herein may have any desired number of fan blades, for example 12, 14, 16, 18, 20, 22, 24, 26, 28, 30, 32, 34, or 36 fan blades.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the steady-state flight conditions according to this aspect correspond to the steady-state flight conditions of the aircraft, as defined elsewhere herein.

According to an aspect of the disclosure, there is provided a method of operating a turbofan gas turbine engine as described and/or claimed herein. The operation may be at the steady-state flight conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the steady-state flight conditions of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
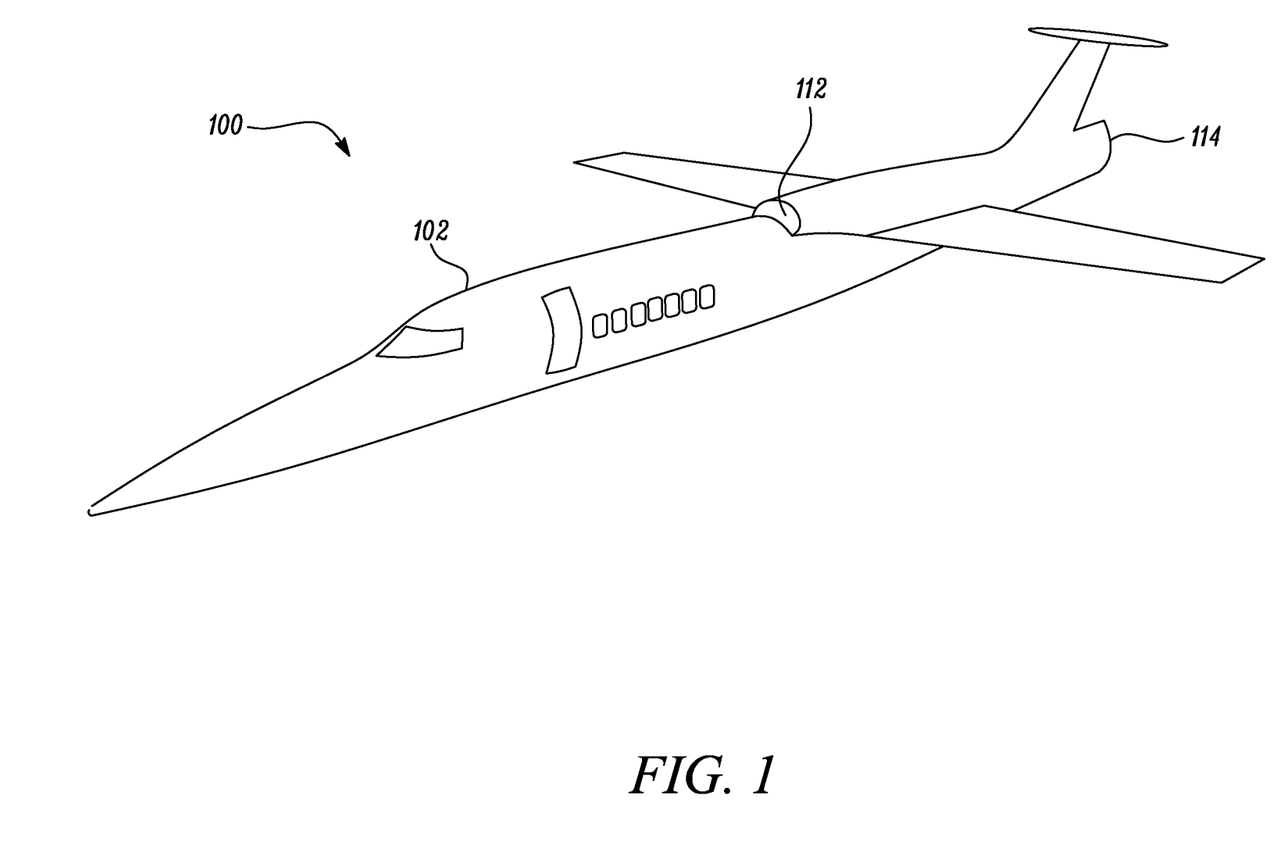
FIG. 1 shows a schematic perspective view of an aircraft according to a first embodiment of the disclosure.
Figure 2:
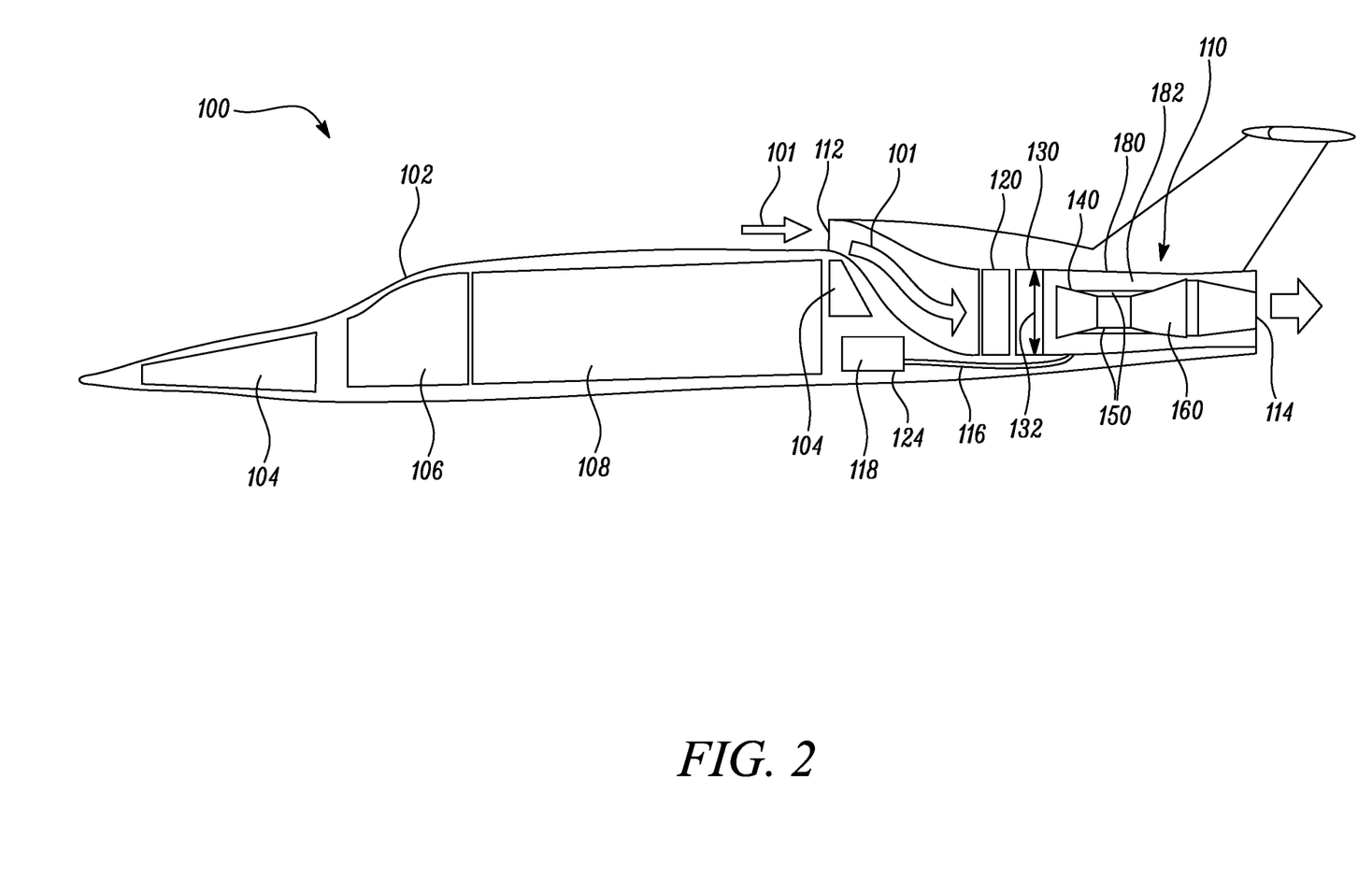
FIG. 2 shows a schematic sectional view of the aircraft of FIG. 1.

Referring to FIGS. 1 and 2, an aircraft according to a first embodiment of the disclosure is designated generally by the reference numeral 100. The aircraft 100 comprises a machine body 102 in the form of a fuselage with wings and a tail plane. The machine body 102 encloses a turbofan gas turbine engine 110, together with a plurality of ancillary systems 104.

Within the machine body 102 there is a cockpit volume 106, a payload volume 108, and a plurality of ancillary systems 104.

The turbofan gas turbine engine 110 comprises, in axial flow sequence, a heat exchanger module 120, a fan module 130, a compressor module 140, a combustor module 150, a turbine module 160, and an exhaust module 170. The turbofan gas turbine engine 110 further comprises a second heat transfer element 124. The second heat transfer element 124 takes the form of a heat exchanger that uses the engine's fuel as a cooling medium.

The fan module 130, compressor module 140, combustor module 150, turbine module 160, and exhaust module 170, together forming the core engine, are enclosed within an outer casing 180. An annular bypass duct 182 is defined between the core engine and the outer casing 180.

The heat exchanger module 120 comprises a plurality of first heat exchanger elements 122. In the present arrangement, illustrated in FIG. 3, the first heat exchanger elements 122 are arranged as a circumferential array of radially extending vanes 122. The inlet air flow 101 passes over the surface of the first heat exchanger elements 122 as the air flow passes through the heat exchanger module 120.

The heat exchanger module 120 has a total heat rejection capacity. The total heat rejection capacity is the amount of waste heat energy that can be dissipated into an air flow passing through the heat exchanger module 120.

The machine body 102 comprises only one fluid inlet aperture 112. The fluid inlet aperture 112 is configured to allow an intake air flow 101 to enter the machine body 102. In other words, there is only one inlet aperture 112 on the machine body 102 through which an air flow 101 can enter the machine body 102.

The intake air flow 101 passes through the heat exchanger module 120 and subsequently passes through the fan module 130. Once through the fan module, the air flow divides into a first flow (not shown) and a second flow (not shown). The first flow (the 'core' flow) passes sequentially through the core engine, i.e. sequentially through compressor module 140, the combustor module 150, the turbine module 160, and the exhaust module 170. The second flow (the 'bypass' flow) exits the fan module 130 and passes through the annular bypass duct 182 to the exhaust module 170.

The machine body 102 further comprises only one fluid exhaust aperture 104. The air flow from the exhaust module 170 exits the machine body 102 through the single fluid exhaust aperture 104. In other words, there is only one exhaust aperture 104 in the machine body 102 through which an air flow 101 can exit the machine body 102.

As outlined above, the machine body 102 of present disclosure includes only two apertures 112,114 in its outer surface; an inlet aperture 112 allowing an air flow into the machine body and an exhaust aperture 114 allowing the air flow to exhaust from the machine body. The presence of apertures in the machine body 102 causes parasitic aerodynamic drag on the machine body 102. As in the present arrangement, the use of only two apertures 112,114 in the machine body 102 minimises this parasitic aerodynamic drag.

In the present arrangement, the fan assembly 130 comprises two fan stages (not shown), with each fan stage comprising a plurality of fan blades (not shown). In the present arrangement each fan stage has the same fan diameter 132, with the respective plurality of fan blades defining a fan diameter of 0.9 m. In an alternative arrangement, the two fan stages may have different fan diameters 132 each defined by the corresponding plurality of fan blades. As previously mentioned, the fan diameter (D) 132 is defined by a circle circumscribed by the leading edges of the respective plurality of fan blades.

In use, both the turbofan gas turbine engine 110 and the ancillary systems 104 generate waste heat energy that is required to be dissipated to ensure the safe operation of the turbofan engine 110 and the ancillary systems 104.

Figure 3:
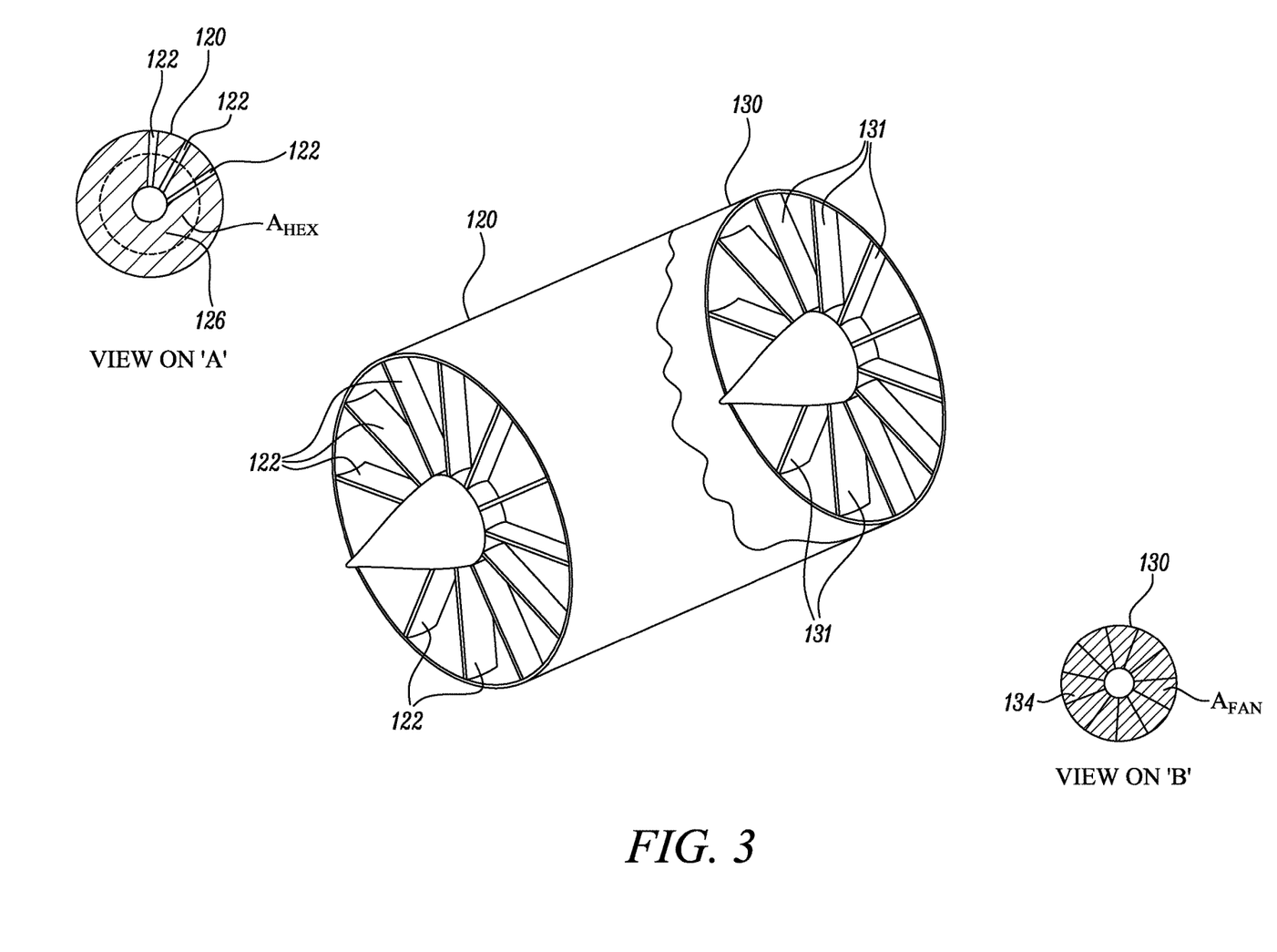
FIG. 3 shows a schematic view of the heat exchanger module and fan module of the turbofan gas turbine engine of the aircraft of FIG. 1.

As shown in FIG. 3, the heat exchanger module 120 has a flow area ($A_{HEX}$) 126. The heat exchanger module flow area 126 is the cross-sectional area of the heat exchanger module 120 through which an inlet air flow 101 passes before being ingested by the fan module 130. In the present arrangement, the heat exchanger module flow area 126 has an annular cross-section and corresponds directly to the shape of the air flow passing through the heat exchanger module 120.

The fan module 130 has a corresponding flow area ($A_{FAN}$) 134. The fan module flow area 134 is the cross-sectional area of the fan module 130 through which an inlet air flow 101 passes before separating into the core engine flow and the bypass flow. The fan assembly flow area 134 has an annular shape since it corresponds to the annular area swept by the fan blades 131.

Figure 4:
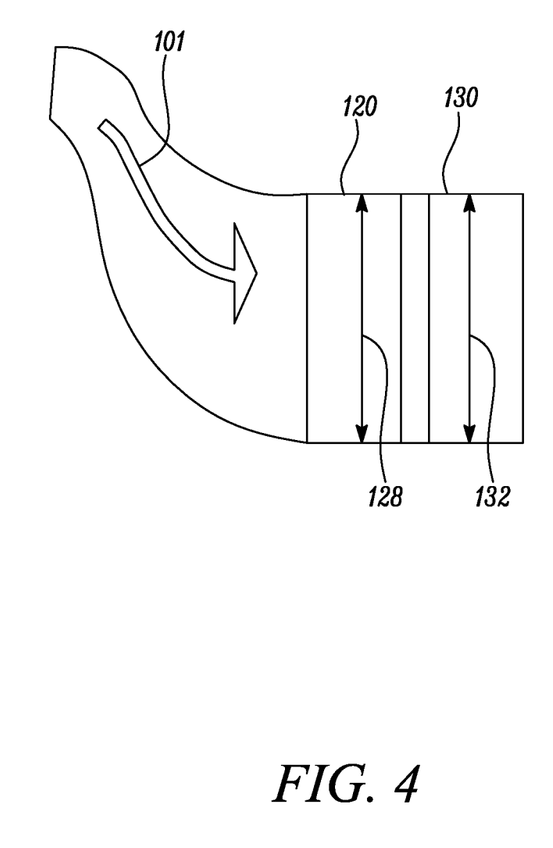
FIG. 4 shows a schematic sectional view of the heat exchanger module and fan module of the turbofan gas turbine engine of the aircraft of FIG. 1.

In the present arrangement (illustrated in FIG. 4) the heat exchanger module flow area 126 is equal to the fan module flow area 134, and the corresponding ratio of $A_{HEX}/A_{FAN}$ is equal to 1.0.

Figure 5:
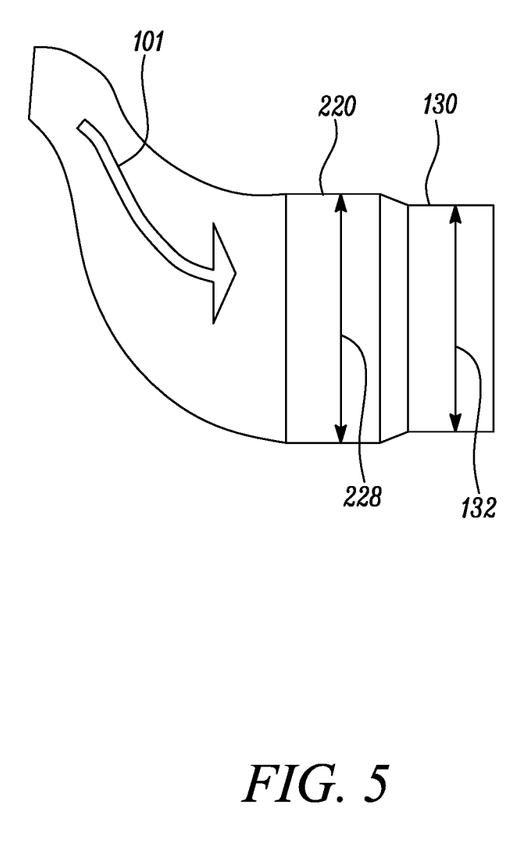
FIG. 5 shows an alternative arrangement of the heat exchanger module and fan module shown in FIG. 4.

The heat exchanger module 120 has a flow diameter (E) 128, which is the diameter of the air flow passing through the heat exchanger module 120. In the present arrangement, shown in FIG. 4, the heat exchanger module flow diameter 128 is equal to the fan diameter 132. In an alternative arrangement (see FIG. 5) the heat exchanger module flow diameter 228 is greater than the fan diameter 132.

The heat exchanger module 120 is configured to transfer a waste heat load from the gas turbine engine 110 and the ancillary systems 104 to the fluid flow 101 prior to the entry of the fluid flow 101 into the fan module 130. A first fluid 116, which in this embodiment is a synthetic oil, is circulated through hot portions of the turbofan engine 110 and the ancillary systems 104 to collect waste heat energy.

As outlined above, once the air flow 101 has passed through the fan module 130, the air flow 101 divides into two flow portions, a first portion being the so-called 'core flow', and a second portion being the so-called 'bypass flow'. The core flow enters the compressor module 140 and continues sequentially through the combustor module 150, turbine module 160, and exhaust module 170. The bypass flow passes through the annular bypass duct 182 into the exhaust module 170. The core flow and the bypass flow join in the exhaust module 170 and are exhausted from the machine body 102 through the exhaust aperture 114.

The core flow can be characterised by the parameter $B_{COMB}$ which represents the proportion of the fluid flow 101 entering the machine body 102 that subsequently passes sequentially through the compressor, combustor, turbine and exhaust modules 140, 150, 160, 170. In the present arrangement, the turbofan engine 110 has a bypass ratio of 2. In this arrangement, the turbofan engine 110 can be characterised by a $B_{COMB}$ parameter of 0.29.

In use, at a cruise condition the aircraft 100 is capable of maintaining a sustained airspeed V (in metres per second, m/s). At this sustained airspeed V, the heat exchanger module 120 transfers a total waste heat energy load H (in Watts, W) to the fluid flow 101.

In use, when the sustained airspeed V of the aircraft 100 is less than Mach 1.0 (i.e. the aircraft 100 is in subsonic flight) the first fluid 116 is circulated through the first heat exchanger elements 122 to dissipate the waste heat energy contained in the first fluid 116 to the inlet fluid flow 101.

When the sustained airspeed V of the aircraft 100 exceeds, for example, Mach 1.0 (i.e. supersonic flight conditions) the temperature of the inlet fluid flow ($T_A$) 101 increases. This temperature increase will significantly reduce the efficiency of the transfer of the waste heat energy from the first fluid 116 to the inlet fluid flow 101. Continued increase in the sustained airspeed V of the aircraft 100 will cause a continued rise in the temperature of the inlet fluid flow 101. Once this temperature $T_A$ reaches the temperature of the first fluid ($T_F$) 116 it will not be possible to dissipate waste heat energy to the inlet fluid flow 101 via the first heat transfer elements 122.

Consequently, in the arrangement of the present invention, when the airflow temperature $T_A$ is equal to or greater than the first fluid temperature $T_F$, the flow of the first fluid 116 is routed through the second heat transfer element 124. The second heat transfer element 124 uses the fuel supply to the turbofan engine 110 as the cooling medium.

While the temperature of the inlet fluid flow $T_A$ 101 will increase at and above a sustained airspeed of, for example, M1.0, the temperature of the engine's fuel will remain substantially constant. By routing the first fluid 116 through the second heat transfer element 124 it becomes possible to continue to dissipate the waste heat energy from the turbofan engine 110 and the ancillary systems 104 even when the temperature of the inlet fluid flow 101 is greater than the temperature of the first fluid 116.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

What is claimed is:

1. An aircraft comprising a machine body, the machine body enclosing a turbofan gas turbine engine and a plurality of ancillary systems, the turbofan gas turbine engine comprising, in axial flow sequence,
   a first heat exchanger module,
   a fan module,
   a compressor module,
   a combustor module, a turbine module, and
   an exhaust module,
   and the aircraft further comprising a second heat exchanger module;
   wherein the machine body comprises a single fluid inlet aperture, the fluid inlet aperture being configured to allow a fluid cooling flow to enter the machine body and to pass through the first heat exchanger module, the first heat exchanger module being configured to transfer a waste heat load from the gas turbine engine and the ancillary systems, contained in a fluid to be cooled, to the fluid cooling flow prior to an entry of the entire fluid cooling flow into the fan module, and the first heat exchanger module including a plurality of first heat exchanger elements that each extend from a portion along a center axis of the first heat exchanger module to an outer circumferential portion of the first heat exchanger module so that the plurality of first heat exchanger elements extend across an entirety of an inlet opening of the first heat exchanger module,
   wherein the second heat exchanger module being configured to transfer the waste heat load contained in the fluid to be cooled to a fuel supply of the turbofan gas turbine engine, and
   wherein the fluid to be cooled is directed through the first heat exchanger module when a temperature of the fluid cooling flow is less than a temperature of the fluid to be cooled, and the fluid to be cooled is directed through the second heat exchanger module, bypassing the first heat exchanger module, when the temperature of the fluid cooling flow exceeds the temperature of the fluid to be cooled.

2. The aircraft as claimed in claim 1, wherein a proportion $B_{COMB}$ of the fluid cooling flow passes sequentially through the compressor, combustor, and turbine modules, wherein the $B_{COMB}$ parameter is defined in the range of 0.20 to 0.71.

3. The aircraft as claimed in claim 2, wherein the $B_{COMB}$ parameter is defined in the range of 0.29 to 0.71.

4. The aircraft as claimed in claim 1, the machine body further comprising a single fluid exhaust aperture, and wherein the single fluid exhaust aperture is configured to channel the fluid flow from the exhaust module out of the machine body.

5. The aircraft as claimed in claim 1, wherein the fan module comprises a plurality of fan blades defining a fan diameter (D), and the fan diameter D is within the range of 0.3 m to 2.0 m.

6. The aircraft as claimed in claim 5, wherein the fan diameter D is within the range of 0.4 m to 1.5 m.

7. The aircraft as claimed in claim 5, wherein the fan diameter D is within the range of 0.7 m to 1.0 m.

8. The aircraft as claimed in claim 1, wherein the first heat exchanger module has a flow diameter that is greater than a fan diameter of fan blades of the fan module.

9. A method of operating an aircraft, the aircraft comprising a machine body, the machine body enclosing a turbofan gas turbine engine and a plurality of ancillary systems, the turbofan gas turbine engine comprising, in axial flow sequence, a first heat exchanger module, a fan module, a compressor module, a combustor module, a turbine module, and an exhaust module, and the aircraft further comprising a second heat exchanger module, and wherein the method comprises:
   (i) providing the machine body with a single fluid inlet aperture, the fluid inlet aperture being configured to allow a fluid cooling flow to enter the machine body and to pass through the first heat exchanger module;
   (ii) configuring the first heat exchanger module to transfer a waste heat load from the gas turbine engine and the ancillary systems, contained in a fluid to be cooled, to the fluid cooling flow prior to an entry of the fluid flow into the fan module, by providing the first heat exchanger module to include a plurality of heat exchanger elements that each extend from a portion along a center axis of the first heat exchanger module to an outer circumferential portion of the first heat exchanger module so that the plurality of heat exchanger elements extend across an entirety of an inlet opening of the first heat exchanger module;
   (iii) configuring the second heat exchanger module to transfer the waste heat load contained in the fluid to be cooled to a fuel supply of the turbofan gas turbine engine;
   (iv) when a temperature of the fluid cooling flow is less than a temperature of the fluid to be cooled, directing the fluid to be cooled to the first heat exchanger module;
   (v) when a temperature of the fluid cooling flow is greater than a temperature of the fluid to be cooled, directing the fluid to be cooled to the second heat exchanger module; and
   (vi) operating the engine such that the entire fluid cooling flow enters the fan module.

10. The method as claimed in claim 9, wherein step (vi) comprises:
   (vi)' operating the engine such that the entire fluid flow enters the fan module, and a proportion $B_{COMB}$ of the fluid flow passes sequentially through the compressor, combustor, and turbine modules, and the $B_{COMB}$ parameter is defined in the range of 0.20 to 0.71.

11. The method as claimed in claim 9, wherein step (i) comprises the additional following step of:
  (i)' providing the machine body with a single fluid exhaust aperture, the single fluid exhaust aperture being configured to channel the fluid flow from the exhaust module out of the machine body.

\* \* \* \* \*